July 29, 1969   P. HOSLER   3,458,399
FERMENTATION OF HYDROCARBONS
Filed Aug. 31, 1966
FIG. 1A
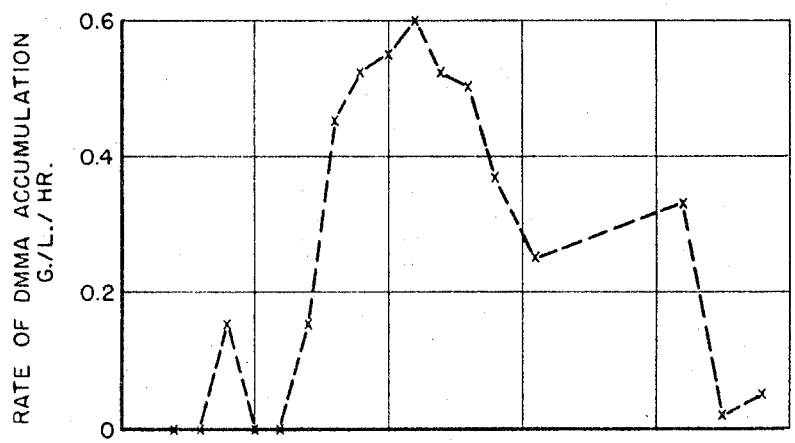
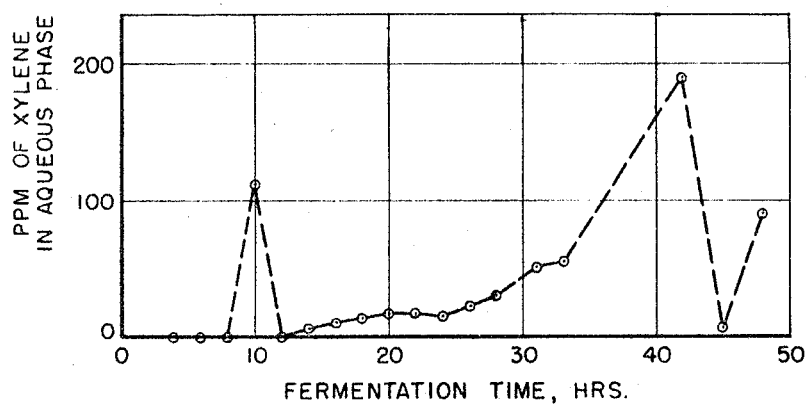
FIG. 1B
INVENTOR.
PETER HOSLER
BY W. E. McCorquodale, Jr
ATTORNEY 3,458,399
FERMENTATION OF HYDROCARBONS
Peter Hosler, Wallingford, Pa., assignor to Sun Oil Company, Philadelphia, Pa., a corporation of New Jersey
Filed Aug. 31, 1966, Ser. No. 576,409
Int. Cl. C12d *13/00*
U.S. Cl. 195—28    15 Claims

ABSTRACT OF THE DISCLOSURE

Microbiological oxidation of liquid aromatic hydrocarbons is improved by controlling the addition of hydrocarbon so that the amount dispersed in an aqueous nutrient medium in excess of the amount absorbed by microorganism cells is less than 200 p.p.m. and is below the limit of solubility of the hydrocarbon in the aqueous nutrient medium.

---

This invention relates to the fermentation of hydrocarbons. More particularly it pertains to the microbiological oxidation of liquid hydrocarbon substrates under aerobic fermentation conditions for the production of oxygenated hydrocarbon derivatives.

The microbiological oxidation of hydrocarbons by means of microorganisms capable of producing oxygenated products has been considered heretofore by numerous investigators. A recent comprehensive review of the subject appears in the textbook "Advances in Enzymology," vol. 27, pages 469–546 (Interscience Publishers, 1965). Many microorganisms are capable of utilizing hydrocarbons as a source of carbon and some of these microorganisms, instead of converting the hydrocarbon either to cellular material or carbon dioxide and water, will effect transformations to intermediate metabolic products which accumulate in the fermentation mixture. Various types of oxygenated hydrocarbon products have been produced in such fermentation reactions, including mono- and dicarboxylic acids, alcohols, ketones, aldehydes, esters, phenols and catechols, and such products often can be accumulated as a result of the microbiological action. Microorganisms capable of doing this include bacteria, yeasts, molds and actinomycetes. Genera in which hydrocarbon-consuming microorganisms usually fall that are capable of yielding oxygen containing transformation products are Micrococcus, Corynebacterium, Nocardia, Pseudomonas, Mycobacterium, Streptomyces, Aspergillus and Acetobacter.

The oxidation of hydrocarbons by microbial fermentation, as heretofore practiced, has not as a rule involved any special control in regard to feeding of the hydrocarbon to the fermentation mixture. Generally, an aqueous nutrient medium containing suitable nutrient salts and trace elements is charged to a fermentor provided with an agitator and with means for aeration, the mixture is inoculated with a selected hydrocarbon-oxidizing microorganism, and the hydrocarbon to be oxidized is then added thereto without particular regard to the concentration of it in the mixture. In most fermentations previously described all of the hydrocarbon feed has been introduced at the beginning, as exemplified in United States Patent No. 2,697,062. Even in those cases where incremental additions of hydrocarbon during fermentation has been practiced, no special effort has been made to maintain the hydrocarbon content in the fermentation mixture at all times below a predetermined maximum low level as hereinafter specified.

The present invention provides an improved procedure for microbiologically oxidizing aromatic hydrocarbons which are liquid at the temperature employed in the fermentation. The improvement is achieved by operating in a way so that no substantial amount of separate hydrocarbon substrate phase is present in the fermentation mixture at any time during the fermentation. Instead, the addition of aromatic hydrocarbon is controlled to keep the amount of unconsumed aromatic hydrocarbon in the fermentation mixture, not counting such hydrocarbon absorbed by the cells, below that amount which is soluble in the aqueous nutrient medium. It has now been found that by controlling the aromatic hydrocarbon addition to maintain its amount below such solubility limit, substantially improved yields of the desired oxidation products can be obtained.

According to the invention, the microbiological oxidation of liquid aromatic hydrocarbon substrates is effected by an improved procedure involving the following steps:

(a) maintaining a dispersion of aromatic hydrocarbon-oxidizing microorganism in an aqueous nutrient medium under aerobic fermentation conditions;
(b) continually feeding a liquid aromatic hydrocarbon substrate to the dispersion while vigorously agitating the mixture; and
(c) controlling the rate of addition of said hydrocarbon so that the amount thereof in the dispersion in excess of the amount absorbed by the microorganism cells is held below 200 p.p.m. and below the limit of solubility of the hydrocarbon in the aqueous nutrient medium.

By controlling the liquid hydrocarbon addition to maintain its concentration as specified, higher rates of production of the desired oxygenated hydrocarbon product can be achieved and greater amounts thereof can be accumulated during the fermentation.

The improved fermentation procedure provided by this invention is applicable to the microbiological oxidation of any aromatic hydrocarbon which is liquid at the temperature used in the fermentation, employing any suitable aromatic hydrocarbon-oxidizing microorganism whose metabolic process effects a partial oxidation of the hydrocarbon. Usually the microorganism will belong to one of the genera referred to above, although many microorganisms of other genera also are usable for the purpose depending upon the particular hydrocarbon charged and type of oxygenated product desired. It is a general rule that any aromatic hydrocarbon-oxidizing microorganism will not, when exposed to substrate concentrations higher than herein specified, produce the desired oxygenated product as effectively as when the liquid aromatic hydrocarbon addition is controlled in accordance with the invention. In fact, with some of the liquid aromatic hydrocarbons, e.g., the xylenes, the use of concentrations which are substantially below the limit of solubility in the aqueous phase may be necessary in some cases to avoid inhibition of the microbial oxidative action.

The invention is particularly useful in the microbiological oxidation of the $C_6$–$C_{10}$ benzenoid hydrocarbons, i.e., benzene and alkylbenzenes having up to four alkyl carbon atoms. In the textbook cited above, numerous prior art references are given pertaining to aromatic oxidations by means of microorganisms. Among the types of oxidations that will occur are the alkyl group oxidations of alkylbenzenes effected by certain cultures of Nocardia, as described by Davis and Raymond in "Applied Microbiology," vol. 9, No. 5, September 1961, pages 383–388 and also in United States Patent No. 3,057,784. Other examples are the fermentation of $C_7$–$C_{10}$ methylbenzenes by means of other Nocardia species which, instead of or in addition to oxidizing the methyl groups, effect oxidation at ring carbon atoms, as described by Raymond and Jamison in United States application Ser. No. 509,621, filed Nov. 24, 1965, now Patent No. 3,383,289. For instance, p-xylene can be converted in this manner to either $\alpha,\alpha'$-dimethylmuconic acid or to p-toluic acid and 2,3-dihydroxy-p-toluic acid by certain strains of Nocardia.

The invention likewise has utility in the microbiological oxidation of the alkylnaphthalenes which are liquid at conventional or suitable fermentation temperatures. For example, 1-methylnaphthalene, 1-ethylnaphthalene, 2-ethylnaphthalene and most of the dimethylnaphthalene isomers are normally liquid hydrocarbons and can be converted by means of various microorganisms to oxygenated products such as naphthoic acids or salicylic acids. (See "Advances in Enzymology," loc cit., pp. 523–525.) Improved results in such fermentations can be achieved by operating in accordance with the invention.

In practicing the invention utilizing any of the liquid aromatic hydrocarbon substrates in combination with a suitable microorganism capable of effecting oxidation thereof, the fermentation can be carried out in more or less conventional fashion except that introduction of the aromatic hydrocarbon is carefully controlled to maintain its concentration below that corresponding to the limit of its solubility in the nutrient medium, not counting the amount of hydrocarbon absorbed by the microorganism cells. This solubility limit will depend mainly on the particular hydrocarbon used and the fermentation temperature employed, but in any event it delimits the substrate concentration range and requires a range that is inordinately low compared to concentrations generally employed heretofore. For some microorganisms it is desirable to maintain the hydrocarbon concentration well below the limit of its solubility in the aqueous salt medium to obtain best results.

Hydrocarbon solubility limits in the nutrient medium usually are less than 200 p.p.m. and often may be less than 75 p.p.m. For instance the limit of solubility of p-xylene in conventional nutrient salt medium at about 30° C. is of the order of 150 p.p.m. During the fermentation the hydrocarbon is continually fed into the mixture, while the latter is being vigorously agitated and aerated, at a rate such that the average concentration of unconsumed hydrocarbon in the aqueous phase (as distinguished from the cells) is continuously maintained below such solubility limit. In some cases it may be best to maintain a quite low hydrocarbon concentration, e.g., 5–20 p.p.m., as some microorganisms can be sensitive to and adversely affected by a higher concentration even though it be substantially below this solubility limit. However, a substantial concentration thereof, e.g., at least 5 p.p.m., should be maintained in the nutrient medium, as otherwise the rate of fermentation will be undesirably slow.

In oxidizing alkylbenzenes of the $C_7$–$C_{10}$ range, e.g., p-xylene, best results generally will be obtained when the unconsumed hydrocarbon concentration is maintained at some level within the range of 5–150 p.p.m. in the aqueous nutrient phase, the optimum level depending upon the particular microorganism being used.

The unconsumed hydrocarbon present in the fermentation mixture at any given time actually is partly dissolved in the aqueous phase and partly absorbed by the microorganism cells. The amounts in each phase can readily be determined by separating the cells from the clear broth by centrifuging or filtrating, then separately extracting the two portions by a suitable solvent (e.g., hexane or isooctane), and determining the amount of hydrocarbon substrate extracted in each case. Determinations made in this manner when using various Nocardia species for oxidizing p-xylene have shown that, under usual fermentation conditions employed in practicing the invention, the p-xylene becomes distributed in about equal amounts between the aqueous phase and the cells. The concentrations above specified refer to only the amounts of hydrocarbon in the aqueous phase and do not include hydrocarbon absorbed by the cells. Thus, the total amount of unconsumed hydrocarbon in the fermentation mixture would be roughly twice that calculated from concentrations as herein reported.

Maintaining the relatively low hydrocarbon concentration, as above described, is beneficial not only in that it minimizes the adverse effects that the liquid aromatic hydrocarbon otherwise could have on the microorganism but also because it reduces losses due to volatilization of hydrocarbon by the aeration gas (air). In cases where, due to faulty control, an excess of hydrocarbon may inadvertently be added during the fermentation, the excess hydrocarbon may inhibit or completely stop the microbial action. Often, however, continued addition of air will evaporate enough of the hydrocarbon to allow the microbial oxidation reaction to proceed again at a satisfactory rate.

The nutrient medium used in the process should contain sources of available nitrogen, phosphorous, sulfur and magnesium and may contain various trace elements and vitamins as conventionally employed or as required by the particular microorganism being used. Mineral salts customarily used for supplying such elements in biological fermentations can be employed. Examples of suitable nitrogen sources are ammonium salts such as $(NH_4)_2SO_4$ or $NH_4Cl$, nitrate salts such as $NH_4NO_3$ or $NaNO_3$, urea, soybean meal and other organic nitrogen sources. The following illustrates a suitable mineral salt composition for the present purpose:

| | Conc., g./l. of $H_2O$ |
|---|---|
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7H_2O$ | 0.005 |
| $Na_2HPO_4$ | 3.0 |
| $KH_2PO_4$ | 2.0 |
| Urea | 2.0 |

This mineral salt composition normally would have a pH of about 7.1. When it is desired to carry out the fermentation at a pH below 7, the amount of $KH_2PO_4$ relative to $Na_2HPO_4$ can be increased to reduce the pH to a lower level.

The fermentation can be carried out batchwise or in continuous fashion provided that the hydrocarbon concentration is maintained as above described. In one manner of practicing the invention a mixture of nutrient medium is prepared in a fermentor provided with means for stirring and for effecting aeration, the mixture is innoculated with the selected hydrocarbon-consuming microorganism and the fermentation is then effected by continually adding the aromatic hydrocarbon feed at proper rate while maintaining fermentation conditions. Generally a temperature in the range of 20–40° C. will be employed and the pH will be maintained in the range of 4–9, usually 6–8. The hydrocarbon may be added continuously or in small increments while the mixture is being vigorously agitated and aerated, provided that the addition rate maintains the desired low average hydrocarbon concentration (e.g., in alkylbenzene oxidation, say 5–150 p.p.m.). The selected aromatic hydrocarbon can be used from the beginning of the fermentation, or the cells can be grown first on some other substrate and the addition of selected aromatic hydrocarbon started later after substantial growth has been obtained. Feeding of the aromatic hydrocarbon at controlled rate is continued preferably until the maximum accumulation of the desired oxidation product has occurred. The broth can then be processed in any suitable manner for recovering the desired oxidation products therefrom. For example, the product can be extracted directly from the whole broth by means of a suitable solvent such as a hydrocarbon or ether, or the cells can be separated first by centrifugation or filtration and the cells and clear broth can be processed separately.

The invention is illustrated specifically by the examples described below, wherein the hydrocarbon substrate is p-xylene. Example I, which is described in conjunction with FIGS. 1A and 1B of the accompanying drawing, shows the oxidation of p-xylene to $\alpha,\alpha'$-dimethylmuconic acid (hereinafter "DMMA") by means of a certain wildtype strain of *Nocardia corallina*. This microorganism has been described in the aforementioned Raymond and Jamison United States application Ser. No. 509,621 and a culture thereof has been deposited with the American Type Culture Collection in Washington, D.C., under the number ATCC 19,070. This Nocardia strain is particularly sensitive to hydrocarbon concentration, being adversely affected even by concentrations of p-xylene that are substantially less than the solubility limit in the aqueous saline medium. Examples II–IV concern the oxidation of p-xylene to both p-toluic acid (hereinafter "PTA") and dihydroxy-p-toluic acid (hereinafter "DHPT") by means of a strain of *Nocardia salmonicolor* likewise deposited and identified by ATCC No. 19,149.

Example I

*Nocardia corallina* ATCC No. 19,070 was used to prepare α,α'-DMMA from p-xylene in a 60 l. fermentor provided with means for aerating and agitating the fermentation mixture. A mineral salt solution of the approximate composition listed above was used as the aqueous nutrient medium. 34 l. of the solution were charged and sterilized and the mixture was then innoculated with the organism. The mixture was stirred vigorously at about 30° C. while being aerated at a constant rate of 0.45 c.f.m. Lard oil was used as a growth substrate and was continuously metered at a rate of 5 ml./hr. into the mixture throughout the run. Also the pH level was automatically held at 6.8 during the run by addition of aqueous caustic soda using a pH controller. The p-xylene was continuously metered into the mixture and samples thereof were taken from time to time and tested to determine the concentration of p-xylene in the aqueous phase. This was done by centrifuging to obtain the clear broth, extracting the latter with isooctane and analyzing the extract by UV spectroscopy. Based on these analyses an effort was made to control the concentration of unconsumed p-xylene in the aqueous phase at less than 30 p.p.m. This was achieved during part of the run, as can be seen by reference to FIG. 1B which shows the variation of such concentration with time from beginning of the p-xylene addition. However, during part of the run and particularly at times of about 10 and 42 hours, the xylene concentration had reached levels considerably higher than intended. The DMMA contents of the whole broth at various times, as indicated in FIG. 1A, were calculated from the amounts of caustic soda fed by the automatic pH controller. From these results the average rates of DMMA production for the time between samplings were calculated, and these results are plotted in FIG. 1A against fermentation time. At the end of the fermentation at about 50 hours, analysis of the whole broth showed that it contained about 12.4 g. DMMA/l. Substantially no PTA or DHPT or other acid product was produced by the microorganism.

A comparison of FIGS. 1A and 1B illustrates the effect of xylene concentration on the ability of the microorganism ATCC No. 19,070 to convert p-xylene to DMMA. During the first eight hours of the run no appreciable p-xylene content of the nutrient salt solution was noted though it was being added, and by the 8th hour production of DMMA was evident. About this time (10th hour) inadequate control allowed the p-xylene to increase to a level (112 p.p.m.) too high for this particular microorganism, as a consequence of which the DMMA production rate became nil. Addition of p-xylene was temporarily stopped while aeration of the mixture was continued, whereupon fermentation restarted. During the period of 14–28 hours good control of the p-xylene concentration in the range of about 10–30 p.p.m. was achieved and a high rate of DMMA production was experienced, with the rate reaching a maximum of 0.6 g. DMMA per l. of whole broth per hour. By the 42nd hour control again had been lost to such extent that the p-xylene concentration slightly exceeded its limit of solubility in the aqueous phase. This practically stopped the fermentation and little DMMA was produced thereafter.

The foregoing example illustrates the importance of controlling the hydrocarbon substrate concentration at a low level that can be tolerated by the particular microorganism being employed. In this case the microorganism was especially sensitive to hydrocarbon concentration, so that concentrations even substantially below the solubility limit inhibited the desired oxidation reaction. The microorganism used in the examples which follow had a higher tolerance for the p-xylene and its oxidizing ability was not so readily inhibited.

Example II

In this run *Nocardia salmonicolor* ATCC 19,149 was used to oxidize p-xylene to DHPT and PTA. The procedure was generally the same as in Example I except that the microorganism was first grown at 30° C. for 37 hours on n-hexadecane and then addition of p-xylene was started. The latter was added as a 75:25 (weight basis) mixture of p-xylene:n-hexadecane. This mixture was added at a constant rate of 20 ml./hr. throughout the run and no attempt was made to control the unconsumed p-xylene content of the aqueous nutrient medium by varying the rate of addition in accordance with rate of consumption. As a consequence the measured values for p-xylene concentration varied from zero during the first portion of the run following p-xylene addition to as high as 672 p.p.m. Six analyses of samples taken over the last 29 hours of fermentation time gave an average p-xylene content of 244 p.p.m. in the aqueous phase. Addition of p-xylene was done during a period totaling 57 hours. Final analyses of the whole broth for DHPT and PTA are given in Table A together with the results from Example III for comparison.

Example III

This run was made in substantially the same way as Example II except that addition of the 75:25 p-xylene:n-hexadecane mixture was started after 23 hours of growth on n-hexadecane alone and the substrate mixture was added throughout the run at controlled rates varied to maintain the p-xylene content of the aqueous phase mainly in the range of 75–135 p.p.m. The total time of feeding this substrate mixture was 41 hours, and good control of the p-xylene concentration was effected during the entire period. Results of final analyses are shown in Table A.

TABLE A

|  | Example II | Example III (good control) |
|---|---|---|
| DHPT content, g./l. | 1.6 | 5.0 |
| PTA content, g./l. | 4.5 | 4.1 |
| Total | 6.1 | 9.1 |

The comparative results tabulated show that considerably better yields of DHPT and of total acid production can be obtained by maintaining good control of the p-xylene concentration so as to keep such concentration consistently below its limit of solubility (150 p.p.m.) in the aqueous phase, as was done in Example III.

Example IV

Three comparative runs were made using ATCC No. 19,149 with the same general procedure as used in Example III but maintaining the p-xylene content of the aqueous phase at levels approximating 25, 75 and 125 p.p.m., respectively. These values are equivalent to about 50, 150 and 250 p.p.m. in the whole broth, since the cells absorbed roughly the same amount of unconsumed p-xylene as was present in the aqeuous phase. In each run the cells were first grown for about 36 hours on n-hexadecane at a pH of about 7.0 and thereafter the pH was kept in the range of 7.5–8.0 and a 90:10 mixture of p-xylene:n-hexadecane was continuously introduced at a rate that maintained the p-xylene concentration at approximately the desired level. The entire fermentation was carried out at 30° C. and the total time allowed after the initial addition of p-xylene was 60 hours. Analyses were made to determine the initial rates of production of DHPT and PTA and also the final yields thereof. Results are shown in Table B.

TABLE B

| p-Xylene conc. in aqueous phase, mg./l. | Initial production rate, g./l./hr. | | Final yld., g./l. | |
|---|---|---|---|---|
| | DHPT | PTA | DHPT | PTA |
| 25 | 0.09 | 0.27 | 1.7 | 6.8 |
| 75 | 0.11 | 0.17 | 2.9 | 5.5 |
| 125 | 0.20 | 0.09 | 5.0 | 4.5 |

The data show that increasing the xylene concentration within the limits tried tended to reduce the formation of PTA while increasing the yield of DHPT.

The foregoing examples are merely illustrative and the principles of the invention can be utilized advantageously in the fermentation of numerous other liquid aromatic hydrocarbons as previously indicated, employing many different species of microorganisms capable of oxidizing such hydrocarbons. While in many cases the particular microorganism being used may not be completely poisoned by a large excess of the hydrocarbon selected as substrate nevertheless the use of relatively low concentrations as herein specified will be advantageous in avoiding oxidation-inhibiting effects and also in minimizing loss of unconsumed hydrocarbon to the exhausted aeration gas.

I claim:
1. In the microbiological oxidation of a liquid aromatic hydrocarbon substrate for production of oxygenated hydrocarbon derivatives, the method which comprises:
   (a) maintaining a dispersion of aromatic hydrocarbon-oxidizing microorganism in an aqueous nutrient medium under aerobic fermentation conditions;
   (b) continually feeding a liquid aromatic hydrocarbon substrate to the dispersion while vigorously agitating the mixture; and
   (c) controlling the rate of addition of said hydrocarbon so that the amount thereof in the dispersion in excess of the amount absorbed by the microorganism cells is held below 200 p.p.m. and below the limit of solubility of the hydrocarbon in the aqueous nutrient medium.

2. Method according to claim 1 wherein said microorganism is of the genus Nocardia.

3. Method according to claim 1 wherein said hydrocarbon is a $C_6$–$C_{10}$ benzenoid hydrocarbon.

4. Method according to claim 3 wherein said hydrocarbon is p-xylene.

5. Method according to claim 1 wherein said microorganism is a hydrocarbon-consuming species of the genera Micrococcus, Corynebacterium, Nocardia, Pseudomonas, Mycobacterium, Streptomyces, Aspergillus and Acetobacter.

6. Method according to claim 5 wherein the microorganism is a Nocardia and such hydrocarbon is a $C_6$–$C_{10}$ benzenoid hydrocarbon.

7. Method according to claim 6 wherein the microorganism is *Nocardia corallina* or *Nocardia salmonicolor*.

8. Method according to claim 1 wherein said hydrocarbon is an alkylnaphthalene.

9. Method according to claim 8 wherein said hydrocarbon is 1-methylnaphthalene, 1-ethylnaphthalene, 2-ethylnaphthalene or a normally liquid dimethylnaphthalene 10. Method according to claim 8 wherein said microorganism is a hydrocarbon-consuming species of the genera Micrococcus, Corynebacterium, Nocardia, Pseudomonas, Mycobacterium, Streptomyces, Aspergillus and Acetobacter.

11. Method according to claim 1 wherein said hydrocarbon is a $C_7$–$C_{10}$ alkylbenzene and the rate of addition of hydrocarbon is controlled to maintain its concentration in the aqueous nutrient medium in the range of 5–150 p.p.m.

12. Method according to claim 11 wherein said alkylbenzene is p-xylene and the microorganism is a species of the genus Nocardia.

13. Method according to claim 12 wherein the microorganism is *Nocardia corallina* or *Nocardia salmonicolor*.

14. Method according to claim 12 wherein the microorganism is a strain of *Nocardia corallina* capable of oxidizing the p-xylene to $\alpha,\alpha'$-dimethylmuconic acid and the concentration of p-xylene in the aqueous nutrient medium is maintained mainly in the range of 5–30 p.p.m.

15. Method according to claim 12 wherein the microorganism is a strain of *Nocardia salmonicolor* capable of oxidizing the p-xylene to p-toluic acid or to 2,3-dihydroxy-p-toluic acid.

References Cited
UNITED STATES PATENTS

| 3,183,169 | 5/1965 | Brillaud | 195—28 |
| 3,201,323 | 8/1965 | Douros et al. | 195—1 |
| 3,219,543 | 11/1965 | Douros et al. | 195—1 |
| 3,340,155 | 9/1967 | Douros et al. | 195—28 |
| 3,383,289 | 5/1968 | Raymond et al. | 195—28 |

LIONEL M. SHAPIRO, Primary Examiner

U.S. Cl. X.R.

195—30, 117